United States Patent
Brist et al.

(10) Patent No.: US 10,309,781 B2
(45) Date of Patent: Jun. 4, 2019

(54) COMPUTING A MAGNETIC HEADING

(71) Applicant: Intel Corporation, Santa Clara, CA (US)

(72) Inventors: Gary A. Brist, Yamhill, OR (US); Kevin J. Daniel, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1563 days.

(21) Appl. No.: 13/834,675

(22) Filed: Mar. 15, 2013

(65) Prior Publication Data

US 2014/0278222 A1    Sep. 18, 2014

(51) Int. Cl.
*G01C 17/38*    (2006.01)

(52) U.S. Cl.
CPC .................. *G01C 17/38* (2013.01)

(58) Field of Classification Search
CPC .............................. G01C 17/02; G01C 17/38
USPC .......................................................... 702/151
See application file for complete search history.

(56) References Cited

U.S. PATENT DOCUMENTS

| 4,143,467 | A | 3/1979 | Erspamer et al. | |
|---|---|---|---|---|
| 6,873,931 | B1 * | 3/2005 | Nower | G01B 11/272 702/151 |
| 2004/0236510 | A1 | 11/2004 | Ockerse et al. | |
| 2004/0254727 | A1 * | 12/2004 | Ockerse | G01C 17/28 701/535 |
| 2009/0048779 | A1 | 2/2009 | Zeng et al. | |
| 2010/0307016 | A1 * | 12/2010 | Mayor | G01C 17/38 33/356 |
| 2011/0153250 | A1 | 6/2011 | Bailey | |
| 2011/0241656 | A1 | 10/2011 | Piemonte et al. | |

(Continued)

FOREIGN PATENT DOCUMENTS

| CN | 101208578 A | 6/2008 |
|---|---|---|
| JP | S54-145568 A | 11/1979 |
| JP | 03-188316 | 8/1991 |

(Continued)

OTHER PUBLICATIONS

International Search Report and Written Opinion received for PCT Patent Application No. PCT/US2014/022703, dated Jun. 20, 2014, 10 pages.

(Continued)

*Primary Examiner* — Mohamed Charioui
(74) *Attorney, Agent, or Firm* — International IP Law Group, P.L.L.C.

(57) ABSTRACT

Techniques for computing a magnetic heading based on sensor data are described herein. An example of a device in accordance with the present techniques includes a magnetic sensor to collect sensor output data and a heading computation engine to compute a magnetic heading based on the sensor output data. The heading computation engine includes logic to measure a level of noise in the sensor output data. The heading computation engine also includes logic to determine whether to average the sensor output data based, at least in part, on the level of noise. The heading computation engine also includes logic to determine an applied sensor output based on the sensor output data. The heading computation engine also includes logic to compute a magnetic heading based, at least in part, on the applied sensor output.

24 Claims, 7 Drawing Sheets

(56) References Cited

U.S. PATENT DOCUMENTS

2013/0282626 A1* 10/2013 White ............... G06Q 30/0201
706/11

FOREIGN PATENT DOCUMENTS

| | | |
|---|---|---|
| JP | H07-508349 A | 9/1995 |
| JP | 2007524805 A | 8/2007 |
| KR | 10-2008-0092326 A | 10/2008 |
| TW | 200905166 A | 2/2009 |
| TW | 201027105 A | 7/2010 |
| TW | 201144754 A | 12/2011 |
| TW | 201443394 A | 11/2014 |
| WO | 2012058718 A1 | 8/1991 |
| WO | 2005003683 A1 | 1/2005 |
| WO | 2014/150243 A1 | 9/2014 |

OTHER PUBLICATIONS

European Search Report for Application No. EP 14767295, dated Sep. 23, 2016, 8 pages.
Wikipedia: "Standard Error"; Feb. 25, 2013, XP-002761773, 8 pages. https://en.wikipedia.org/w/index.php?title=Standard_error&oldid=540296554.
Improving Accuracy through Averaging—National Instruments, Sep. 6, 2006, XP-002761774, 2 pages. http://www.ni.com/white-paper/3488/en.
Stephanie Bell; "A Beginner's Guide to Uncertainty of Measurement"; National Physical Laboratory, Dec. 31, 1999; XP002761775; 40 pages. http://www.wmo.int/pages/prog/gcos/documents/gruanmanuals/UK_NPL/mgpg11.pdf.
CN Search Report, CN Application No. 2014800089969, dated Feb. 28, 2017, 1 page.

* cited by examiner

100

400

| 2Degree Accuracy at 95% Confidence | | Known Noise Range == 30 | Known Noise Range == 10 |
|---|---|---|---|
| Sensor Mag | Allowed Noise | Sample Size N | Sample Size N |
| 50 | 1.7 | 25 | 10 |
| 100 | 3.5 | 13 | 6 |
| 150 | 5.2 | 10 | 5 |
| 200 | 7.0 | 8 | 4 |
| 300 | 10.5 | 6 | 3 |
| 400 | 14.0 | 5 | NA |
| 500 | 17.4 | 4 | NA |
| 750 | 26.2 | 4 | NA |
| 1000 | 34.9 | NA | NA |
| 2000 | 69.8 | NA | NA |
| 3000 | 104.7 | NA | NA |

502

| 1Degree Accuracy at 90% Confidence | | Known Noise Range == 30 | Known Noise Range == 10 |
|---|---|---|---|
| Sensor Mag | Allowed Noise | Sample Size N | Sample Size N |
| 50 | 0.9 | 36 | 13 |
| 100 | 1.7 | 19 | 8 |
| 150 | 2.6 | 13 | 6 |
| 200 | 3.5 | 11 | 5 |
| 300 | 5.2 | 8 | 4 |
| 400 | 7.0 | 6 | 3 |
| 500 | 8.7 | 5 | 3 |
| 750 | 13.1 | 4 | NA |
| 1000 | 17.5 | 4 | NA |
| 2000 | 34.9 | NA | NA |
| 3000 | 52.4 | NA | NA |

COMPUTING A MAGNETIC HEADING

TECHNICAL FIELD

The present disclosure relates generally to techniques for computing a magnetic heading using a magnetic sensor. More specifically, the present disclosure relates generally to techniques for mitigating time-varying magnetic noise received by a magnetic sensor.

BACKGROUND ART

Magnetic sensors are often integrated within the platforms of computing devices and are used as compasses to measure or detect heading information, e.g., information relating to the direction the computing device is pointing. Such heading information may be used for navigation applications, perceptual computing applications, gaming applications, and the like. However, interference induced by the platforms of the computing devices may impede the proper functioning of the magnetic sensors, resulting in inaccurate heading measurements. The heading and accuracy of digital compasses can be dynamically influenced by both the environment in which the device is operating and the system state of the platform containing the digital compass. The algorithms to determine heading and accuracy can be complex and require large number of sensor readings.

BRIEF DESCRIPTION OF THE DRAWINGS

FIG. 5 is a set of example tables that relate the measured sensor magnitude and measured noise level to the sample size used in the sensor output averaging for a particular heading accuracy and confidence level.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure describes computationally efficient techniques for mitigating time-varying magnetic noise received by a magnetic sensor. As discussed above, magnetic noise received by a magnetic sensor may impede the proper functioning of a magnetic sensor within the computing device by shifting the magnetic field induced by the platform at the input of the magnetic sensor. Time-varying magnetic noise can be mitigated by averaging sensor readings.

To improve the computational efficiency of the averaging process, the number of samples used to compute the sensor reading can be determined based on system information such as the noise level received by the sensor as well as other factors such as the heading accuracy and the confidence level desired for a particular use case. Furthermore, the sample size can be dynamically adjusted based on changes in the noise level, the desired heading accuracy, and the desired confidence level. By adjusting the sample size based on the noise level, the computing device can compute a magnetic heading that satisfies the desired accuracy and confidence level using a reduced number of samples. Reducing the number of samples used to calculate the magnetic heading improves the computational efficiency of the averaging process.

In some cases, the complexity of the algorithm used to compute the magnetic heading can also be reduced. For example, if the noise level is low enough, the magnetic heading that satisfies the desired accuracy can be calculated using a single sensor reading and the averaging process may be skipped. Skipping the averaging process further increases the computational efficiency of the magnetic heading computation. Improving the computational efficiency of the magnetic heading computation enables the device to calculate the magnetic heading with fewer processing steps, resulting in faster computations and reduced power consumption.

Figure 1:
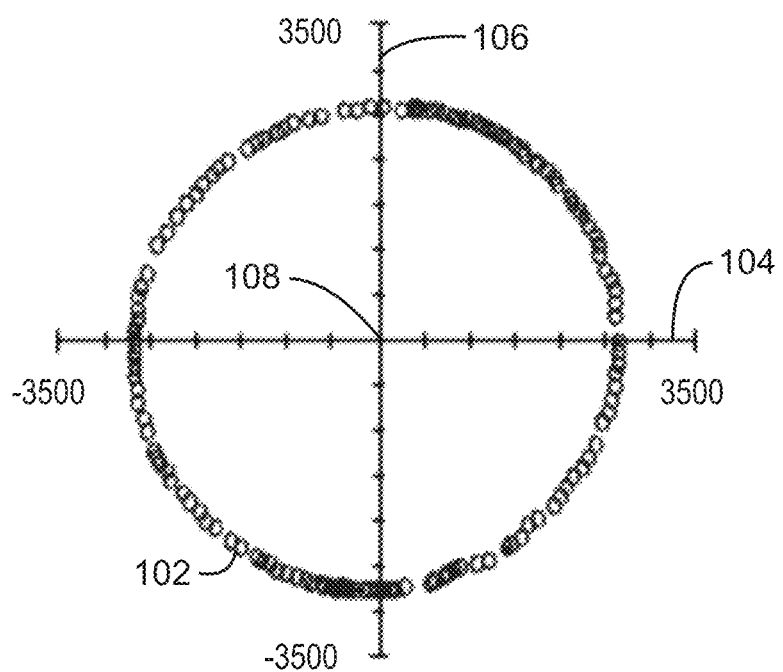
FIG. 1 is a graph showing an output of a magnetic sensor across all magnetic sensor orientations within a constant magnetic field.

FIG. 1 is a graph showing an output of a magnetic sensor across all magnetic sensor orientations within a constant magnetic field. The graph is referred to by the reference number 100. The output 102 of the magnetic sensor may be a scalar number, referred to herein as a count, with a higher number of counts indicating a higher magnetic field strength. An x-axis 104 of the graph 100 represents a number of counts in the x-direction, and a y-axis 106 of the graph 100 represents a number of counts in the y-direction. As shown in FIG. 1, the magnetic sensor generates a centroid 108 at the origin, i.e., at an x-y coordinate of (0, 0), when rotated about the magnetic sensor's z-axis in a constant magnetic field. The magnetic heading can be computed as a function of the position of the sensor output along the centroid in relation to the centroid center.

The magnetic field measured by a magnetic sensor, e.g., $B_{sensor}$, in a platform of a computing device, with negligible distortion with respect to rotation, can be expressed as a vector addition of three magnetic fields and their respective coordinate systems, as shown below in Equation 1. The three magnetic fields include the magnetic field induced by the platform, e.g., $B_{platform}$, the earth's magnetic field, e.g., $B_{earth}$, and any contribution from magnetic sources external to the platform, e.g., $B_{ambient}$.

$$B_{sensor}\begin{bmatrix}\hat{x}\\\hat{y}\\\hat{z}\end{bmatrix} = B_{platform}\begin{bmatrix}\hat{x}\\\hat{y}\\\hat{z}\end{bmatrix} + \left(B_{earth}\begin{bmatrix}x\\y\\z\end{bmatrix} + B_{ambient}\begin{bmatrix}x\\y\\z\end{bmatrix}\right)R(\phi, \theta, \varphi) \quad \text{Eq. 1}$$

In Equation 1, $$\begin{bmatrix}\hat{x}\\\hat{y}\\\hat{z}\end{bmatrix}$$

is equal to the platform/sensor coordinates, and $$\begin{bmatrix} x \\ y \\ z \end{bmatrix}$$

is equal to the world coordinates. In addition, R(ϕ, θ, φ) is the rotational translation matrix of the platform/sensor coordinates and the world coordinates. The absolute value of each vector is a function of both the strength of the magnetic sources and the proximity to the boundaries in both the world and platform/sensor coordinate systems.

The true heading of the platform can be determined according to Equation 2.

$$\text{Magnetic North} = \arctan\left(\frac{B_{earth}y}{B_{earth}x}\right) \qquad \text{Eq. 2}$$

The above formulas are based on the centroid 108 being centered about the origin. However, steady state noise introduced by components of the platform may tend to cause a shift in the centroid. To correctly calculate the angle from the arctan function shown in Equation 2, the magnetic sensor output can be adjusted to account for the platform induced magnetic field at the magnetic sensor, as further described in relation to FIG. 2.

Figure 2:
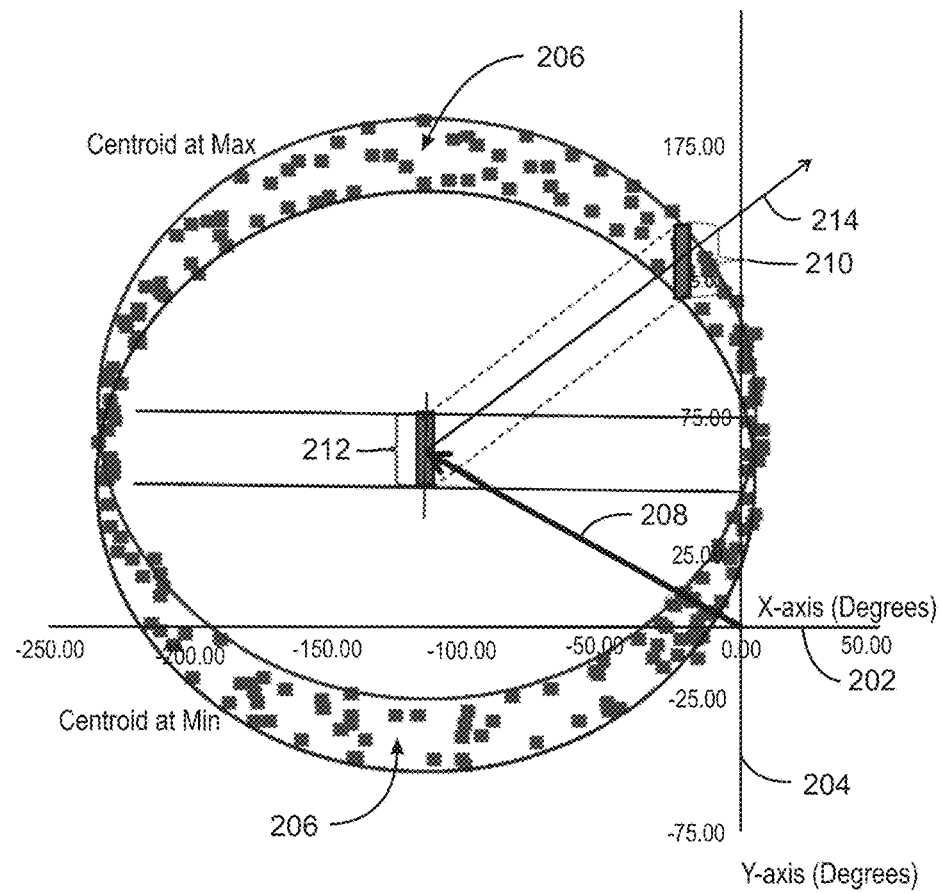
FIG. 2 is a graph showing an output of a magnetic sensor affected by steady-state platform noise and a time-varying noise source.

FIG. 2 is a graph showing an output of a magnetic sensor affected by steady-state platform noise and a time-varying noise source. In the graph 200, the x-axis 202 of the graph 200 represents a number of counts in the x-direction, and a y-axis 204 of the graph 200 represents a number of counts in the y-direction. The graph 200 shows an output 206 of the magnetic sensor for a case in which the platform contains a magnetic field source that is fixed within the same reference frame of the magnetic sensor and, thus, produces a constant shift across all orientations. The constant shift is exhibited as a shift of the centroid center from the origin, as shown by the arrow 208. The shift in the centroid center can be determined, for example, during a factory calibration of the magnetic sensor.

The output 206 also exhibits time-varying noise, which may be due to a time-varying current that injects random noise at the sensor output. The time-varying noise may be due to external noise sources. The time varying noise at the sensor adds noise to the sensor output 206, which influences the sensor output position along the centroid as well as the process and certainty of determining the centroid center. The output range at a fixed orientation of the sensor is shown by the rectangle 210. If the orientation of the sensor is fixed, noise-induced changes in the sensor output and the centroid center will be paired, meaning that the noise shifts the true centroid center by the same amount and direction as exhibited by the sensor output 206. The centroid center range due to the time-varying noise source is shown by the rectangle 212. By averaging the sensor output 206, an average sensor output can be determined and used to compute the magnetic heading 214. Furthermore, if the sensor is stationary, the average sensor output can be used to estimate the effect of the noise on the position of the centroid center. The estimated centroid center can then also be used in the heading calculation.

The average sensor output can be computed using any suitable number of sensor output samples. The number of sensor output samples is referred to herein as the sample size. In some embodiments, the sample size can be automatically selected based on the detected noise level experienced by the sensor. If the detected noise level is below a threshold noise level dictated by the desired heading accuracy, a single sample may be used to calculate the heading 214, in which case the averaging process may be skipped and the actual sensor output can be used to compute the heading. The sensor output data that is actually used in the heading calculation may be referred to herein as the applied sensor output, and can include either the actual sensor output (sample size=1) or an average sensor output (sample size>1).

Figure 3:
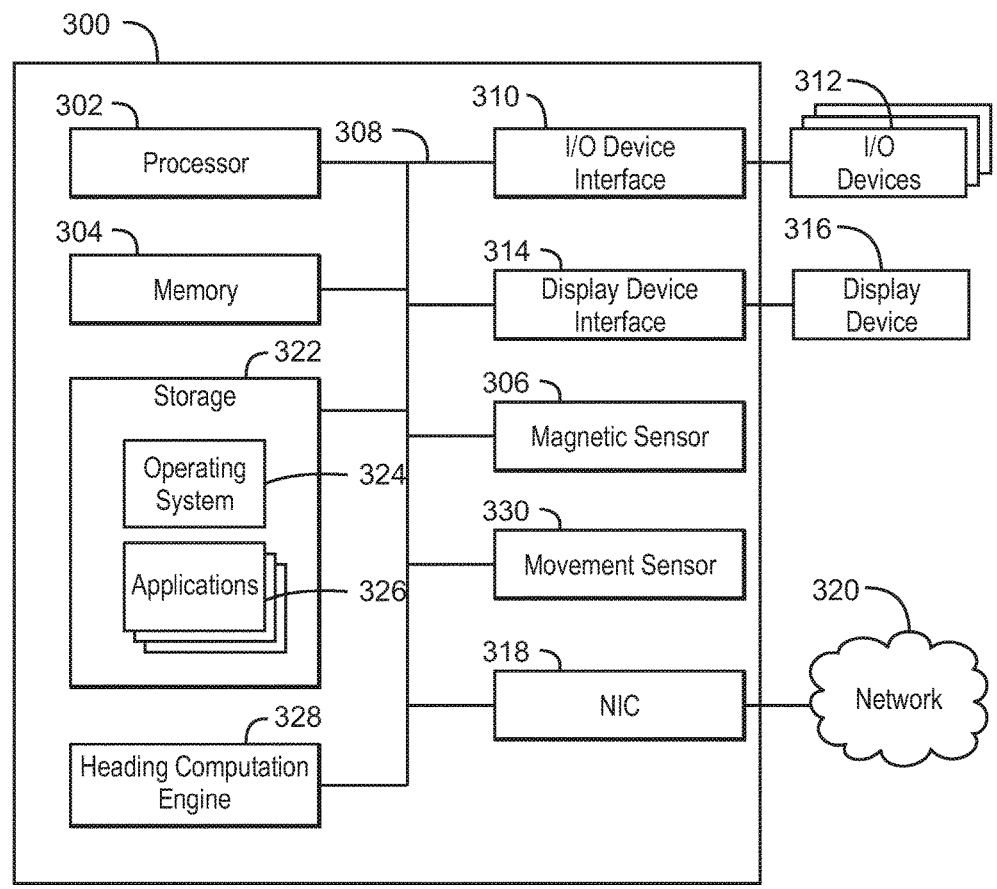
FIG. 3 is a block diagram of a computing device in which the technique for computing a magnetic heading described herein may be implemented.

FIG. 3 is a block diagram of a computing device in which the technique for computing a magnetic heading described herein may be implemented. The computing device 300 may be, for example, a laptop computer, desktop computer, tablet computer, mobile device, server, or cellular phone, among others. The computing device 300 may include a processor 302 that is adapted to execute stored instructions, as well as a memory device 304 that stores instructions that are executable by the processor 302. The processor 302 can be a single core processor, a multi-core processor, a computing cluster, or any number of other configurations. The processor 302 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 302 includes dual-core processor(s), dual-core mobile processor(s), or the like.

The memory device 304 can include random access memory (e.g., SRAM, DRAM, zero capacitor RAM, SONOS, eDRAM, EDO RAM, DDR RAM, RRAM, PRAM, or the like), read only memory (e.g., Mask ROM, PROM, EPROM, EEPROM, or the like), flash memory, or any other suitable memory systems. The memory device 304 stores instructions that are executable by the processor 302 to compute a magnetic heading based, at least in part, on data received from the magnetic sensor 306.

The processor 302 may be connected through a system bus 308 (e.g., PCI, ISA, PCI-Express, HyperTransport®, NuBus, or the like) to an input/output (I/O) device interface 310 adapted to connect the computing device 300 to one or more I/O devices 312. The I/O devices 312 may include, for example, a keyboard, a pointing device, and the like. The pointing device may include a touchpad or a touchscreen, among others. The I/O devices 312 may be built-in components of the computing device 300, or may be devices that are externally connected to the computing device 300.

The processor 302 may also be linked through the system bus 308 to a display device interface 314 adapted to connect the computing device 300 to a display device 316. The display device 316 may include a display screen that is a built-in component of the computing device 300. The display device 316 may also include a computer monitor, television, or projector, among others, that is externally connected to the computing device 300.

The processor 302 may also be linked through the bus 308 to a network interface controller (NIC) 318. The NIC 318 may be configured to connect the processor 302 through the bus 308 to a network 320. The network 320 may be a wide area network (WAN), local area network (LAN), or the Internet, among others The computing device 300 may also include a storage device 322. The storage device 322 may include a physical memory such as a hard drive, an optical drive, a flash drive, an array of drives, or the like. The storage device 322 may also include remote storage drives. The storage device 322 may store instructions thereon to provide support for computing the magnetic heading based on the system information of the computing device 300.

The storage device 322 may include an operating system 324. The operating system 324 may have installed thereon one or more drivers. The drivers may enable a piece of hardware or one or more applications 326 installed on the operating system 324 and residing within the storage device 322 to communicate with the operating system 105 or other hardware of the computing device 100, including the magnetic sensor 306. The drivers may also be used to enable a heading computation engine 328 to communicate sensor data from the magnetic sensor 306 to any of the one or more applications 326 installed on the operating system 324.

In various embodiments, the magnetic sensor 306 is connected to the processor 302 via the bus 308. The magnetic sensor 306 may also be connected directly to the processor 302 via a private bus or sensor interface (not shown). Further, in various embodiments, the magnetic sensor 306 is communicably coupled to a heading computation engine 328 via the sensor interface. The heading computation engine 328 may be configured to collect sensor output from the magnetic sensor 306. In some embodiments, one or more microcontrollers within the computing device 300 may provide the sensor output collected via the magnetic sensor 306 to the heading computation engine 328. Additionally, the computing device 300 can also include one or more movement sensors 330 that are configured to detect movement of the computing device 300. Examples of movement sensors 330 include gyroscopes, accelerometers, and the like. The heading computation engine 328 can receive data related to the movement of the computing device 300 from the movement sensor 330, which can be used to indicate whether the magnetic sensor 306 is stationary.

The heading computation engine 328 is implemented in hardware or a combination of hardware and programming code. In some embodiments, the heading computation engine 328 operates at the kernel level and is implemented via the operating system 324 of the computing device 100. In other embodiments, the heading computation engine 328 operates at the processor level and is implemented via the processor 302 and any number of other hardware residing within the computing device 100. Furthermore, in various embodiments, the heading computation engine 328 is simultaneously implemented via both the operating system 324 and the processor 302. In addition, in some embodiments, the heading computation engine 328 includes firmware. For example, the heading computation engine 328 may include resistor-transistor logic (RTL) or any other suitable type of logic that exists at the kernel level and/or at the processor level.

The heading computation engine 328 may be configured to receive sensor output from the magnetic sensor 306 and compute a magnetic heading. As described further below, the heading computation engine 328 can determine a noise level based on the sensor output received from the magnetic sensor 306. The determined noise level can then be used to determine whether averaging will be used to compute the applied sensor output. If averaging is used, the noise level can also be used to determine the sample size used to compute the applied sensor output. In some embodiments, the noise level is determined when the magnetic sensor 306 is stationary. The heading computation engine 328 can determine that the magnetic sensor 306 is stationary based on data received from the movement sensor 330.

The heading computation engine 328 can also receive data relating to a desired heading accuracy and confidence level, which may also be used by the heading computation engine 328 in the calculation of the applied sensor output. For example, the desired heading accuracy and confidence level can be used to compute a threshold noise level that is used to determine whether averaging is used to compute the applied sensor output. If averaging is used, the desired heading accuracy and confidence level can be used to determine the sample size to use in the averaging process based on the measured noise level. The confidence level is a value that describes the level of certainty that the computed heading is within a range determined by the specified level of accuracy.

In some embodiments, the desired accuracy and confidence level can be a static value that is programmed, for example, into the code used for computing the magnetic heading. In some embodiments, the desired accuracy and confidence level can be dynamically adjusted. For example, the desired accuracy and confidence level can be set and/or reset by a user through a user interface of the computing device 300. In some embodiments, the desired accuracy and confidence level can be specified by an application 326. For example, if one of the applications 326 becomes active or a focal application of the computing device 300, the application 326 may send a signal or other data to the heading computation engine 328 identifying a particular accuracy and confidence level to be used in computing the heading. Techniques for computing the magnetic heading are described further below in relation to FIGS. 4-6.

It is to be understood that the block diagram of FIG. 3 is not intended to indicate that the computing device 300 is to include all of the components shown in FIG. 3. Further, the computing device 300 may include any number of additional components not shown in FIG. 3, depending on the details of the specific implementation.

Figure 4:
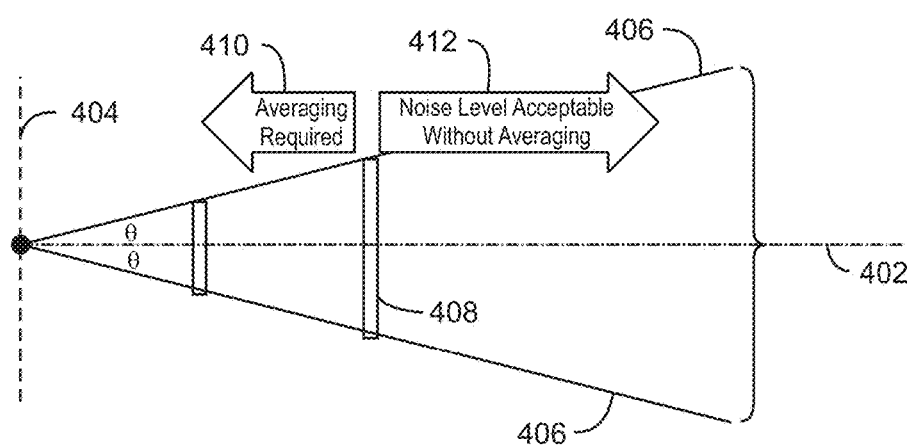
FIG. 4 is a diagram illustrating a technique for determining whether sensor output averaging is used to compute the magnetic heading.

FIG. 4 is a diagram illustrating a technique for determining whether sensor output averaging is used to compute the magnetic heading. The process described herein may be implemented, for example, by the heading computation engine 328 of FIG. 3. To determine whether averaging is to be used, the magnitude of the sensor output and the magnitude of noise in the sensor output can be measured. The magnitude of the sensor output may be computed according to Equation 1.

$$\text{Sensor Magnitude} = \sqrt{Sx^2 + Sy^2 + Sz^2} \qquad \text{Eq. 1}$$

In Equation 1, Sx equals the number of counts in the x direction, Sy equals the number of counts in the y direction, and Sz equals the number of counts in the z direction. The magnitude of the noise in the sensor output can be computed as the maximum variation in the magnetic sensor output while the magnetic sensor is stationary. The measured magnitude of the noise divided by the sensor magnitude equals the signal-to-noise ratio of the magnetic sensor output.

A noise threshold can be computed based on desired accuracy of the computed magnetic heading. If the sensor noise is greater than the noise threshold, then averaging may be used to increase the certainty of the magnetic heading computation. If the sensor noise is less than the noise threshold, then averaging may be skipped and the heading computation can be based on the raw sensor output. The noise threshold can be computed according to Equation 2.

$$\text{Noise Threshold} = 2 \sin \theta \cdot \text{Sensor Magnitude} \qquad \text{Eq. 2}$$

In Equation 2, θ is the desired heading accuracy in degrees. Thus, for example, if the desired heading accuracy is plus-minus 4 degrees, the noise threshold will be approximately 14 percent of the signal magnitude. If the desired accuracy is plus-minus 0.3 degrees, the noise threshold will be approximately 1 percent of the signal magnitude. The desired heading accuracy may be specified as described above in relation to FIG. 3 and may depend on the type of navigation requirements for a specific use case. In some embodiments, the noise level is periodically measured and compared to a threshold noise level to determine whether averaging is used If the sensor noise is computed only when the sensor is stationary, the sensor output magnitude may be updated more frequently than the magnitude of the sensor noise. Thus, in some embodiments, the measured noise range may be used to compute a threshold signal magnitude. The threshold signal magnitude may be compared to a measured signal magnitude to determine whether averaging is used. The threshold signal magnitude can be computed according to Equation 3.

$$\text{Signal Magnitude Threshold} = \frac{\text{Measured Noise}}{2\sin\theta} \qquad \text{Eq. 3}$$

The techniques described above are illustrated in FIG. 4. In the diagram of FIG. 4, the x-axis 402 represents signal magnitude and the y-axis 404 represents the noise magnitude. As shown in FIG. 4, the desired accuracy, θ, determines a sector bounded by the radial lines 406. The height of the vertical line 408 represents the measured noise. The line 408 defines the signal magnitude threshold and is positioned at the signal magnitude where the ends of the line 408 meet the radial lines 406. If the measured signal magnitude is less than the signal magnitude threshold as illustrated by the arrow 410, then averaging is used to determine the applied signal output which is used to calculate the magnetic heading. If the measured signal magnitude is greater than the signal magnitude threshold as illustrated by the arrow 412, then averaging is not used and the raw sensor output is used as applied signal output. If averaging is used to determine the applied sensor output, the sample size used to average the sensor output can be determined as described below in relation to FIG. 5.

FIG. 5 is a set of example tables that relate the measured sensor magnitude and measured noise level to the sample size used in the sensor output averaging for a particular heading accuracy and confidence level. Table 500 shows calculated sample sizes for a 2-degree heading accuracy with a 95% confidence level. Table 502 shows calculated sample sizes for a 1-degree heading accuracy with a 90% confidence level. The sample sizes shown in tables 500 and 502 may be computed according to Equation 4.

$$N > 1 - \log(\alpha)/\ln\left(1 + \frac{\text{Sensor Magnitude} \cdot \sin(\theta)}{\text{Measured Noise}}\right) \qquad \text{Eq. 4}$$

In Equation 4, N is the number of samples, and α is the confidence value, which is equal to 1 minus the confidence percentage (for example, for a 95 percent confidence, α (equals 0.05). As an example, if a 2 degree heading accuracy and 95% confidence level has been specified for the calculation of the magnetic heading, the number of samples used to compute the applied sensor output is given in Table 502.

The heading accuracy and the confidence level determine the noise threshold, referred to as the allowed noise in tables 500 and 502. The intersection of the sensor magnitude and the measured noise provides the applicable sample size.

In some embodiments, the number of samples may be calculated by the heading computation engine 328 using the above formula. In some embodiments, lookup tables using the above formula may be created and stored into the electronic device 300 of FIG. 3. For example, lookup tables similar to the tables 500 and 502 may be stored in a memory device of the heading computation engine 328, the storage device 322, or some other memory device of the electronic device 300 that is accessible to the heading computation engine 328. Any suitable number of lookup tables may be constructed and stored for different heading accuracies and confidence levels.

Figure 6:
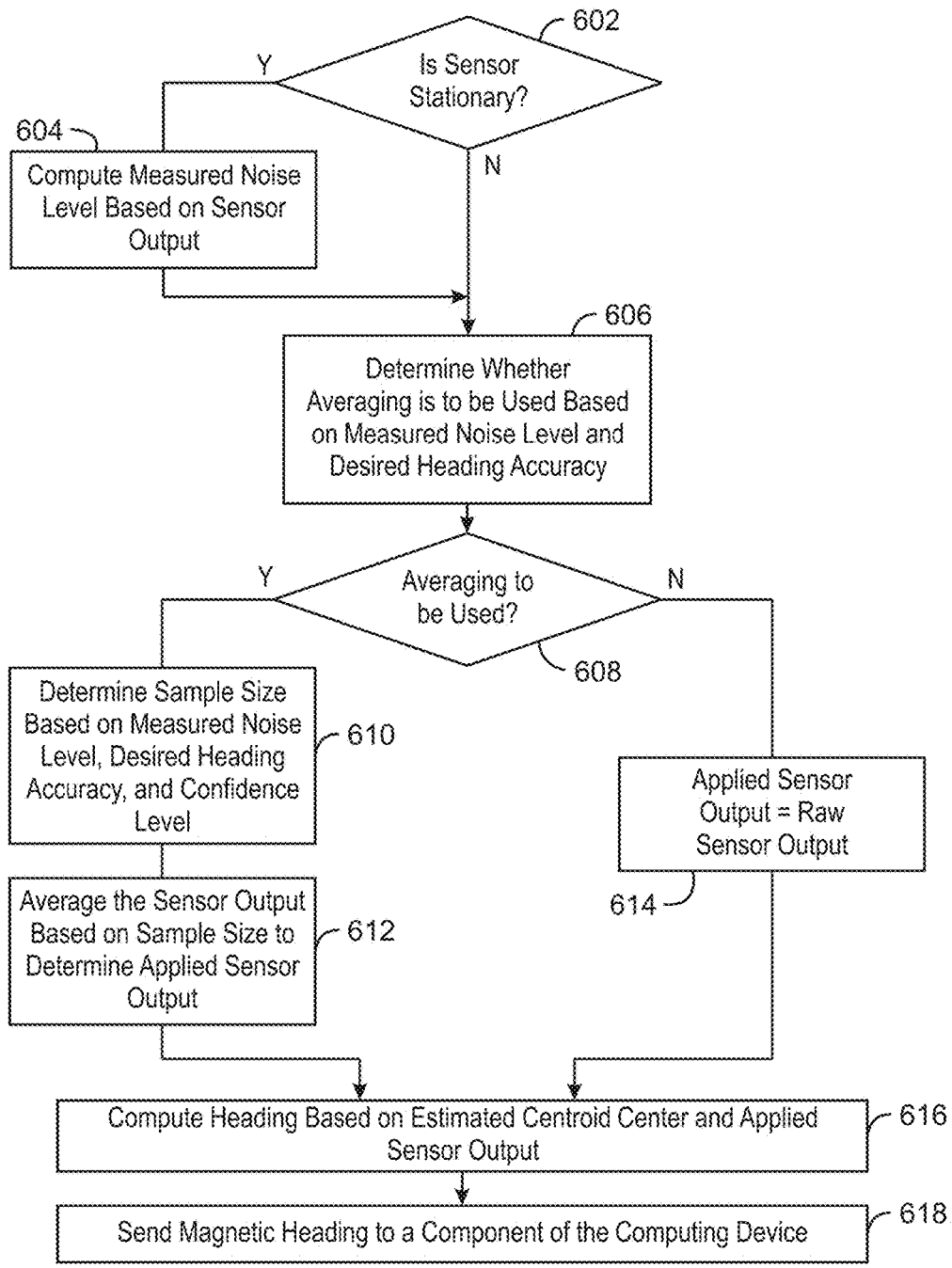
FIG. 6 is a process flow diagram of a method of computing a magnetic heading using magnetic sensor output.

FIG. 6 is a process flow diagram of a method of computing a magnetic heading using magnetic sensor output. The process described herein may be implemented, for example, by the heading computation engine 328 of FIG. 3. The method may begin at block 602, wherein a determination is made regarding whether the sensor is stationary. This determination may be made, for example, based on data received from a motion sensor such as an accelerometer, gyroscope, or any other suitable motion detecting device. If the sensor is stationary, the process flow may advance to block 604.

At block 604, the noise level of the magnetic sensor output is measured. The noise level may be measured by receiving a number of samples of magnetic sensor output and determining the sensor output range. The measured noise level may be characterized as the magnitude of the maximum variation in the samples of sensor output data. The measured noise level may be periodically updated any time that the magnetic sensor is determined to be stationary. If the magnetic sensor is not stationary, block 604 may be skipped and the previous measured noise level may be used for remainder of the following process steps. The process flow may then advance to block 606.

At block 606, a determination is made regarding whether averaging is to be used in computing the magnetic heading. This determination may be based on the measured noise level and the desired heading accuracy, as described above in relation to FIG. 4. If averaging is to be used, the process flow may advance from block 608 to block 610.

At block 610, the sample size to be used in the averaging process is determined. In some embodiments, the sample size is computed based on the measured noise level, the desired heading accuracy, and the desired confidence level, as described above in relation to FIG. 5. For example, the sample size can be computed using Equation 4 or obtained from a lookup table stored to the electronic device.

At block 612, the raw sensor output can be averaged based on the sample size. The average sensor output is then later used as the applied sensor output. As noted above, the applied sensor output refers to the sensor data that is used to compute the magnetic heading. In some embodiments, the average sensor output is computed as the sum of the sensor outputs divided by the sample size. In some embodiments, the average sensor output is computed by summing the maximum sensor output and the minimum sensor output and dividing the result by two.

Returning to block 606, if it is determined that averaging is not to be used, the process flow may advance from block 608 to block 614. At block 614, the applied sensor output is set to the raw sensor output. Accordingly, each output of the magnetic sensor may be used to compute the magnetic heading, and the averaging process can be skipped. From block 612 or block 614, the process flow may advance to block 616.

At block 616, the magnetic heading is computed based on the estimate centroid center and the applied sensor output. The magnetic heading can be computed as described above in relation to FIGS. 1 and 2. For example, the estimated centroid center can be used to re-center the sensor output data. The position of the applied sensor output along the re-centered centroid determines the magnetic heading.

At block 618, the magnetic heading can be communicated to another component of the computing device. For example, the magnetic heading can be sent to an application such as a mapping application, a compass application, a position finding application, or any other application that uses a magnetic heading. In some embodiments, the magnetic heading may be displayed to the user of the electronic device. In some embodiments, the magnetic heading may be used in additional calculations. For example, the magnetic heading may be used as part of a computational routine that computes a position of the electronic device.

Figure 7:
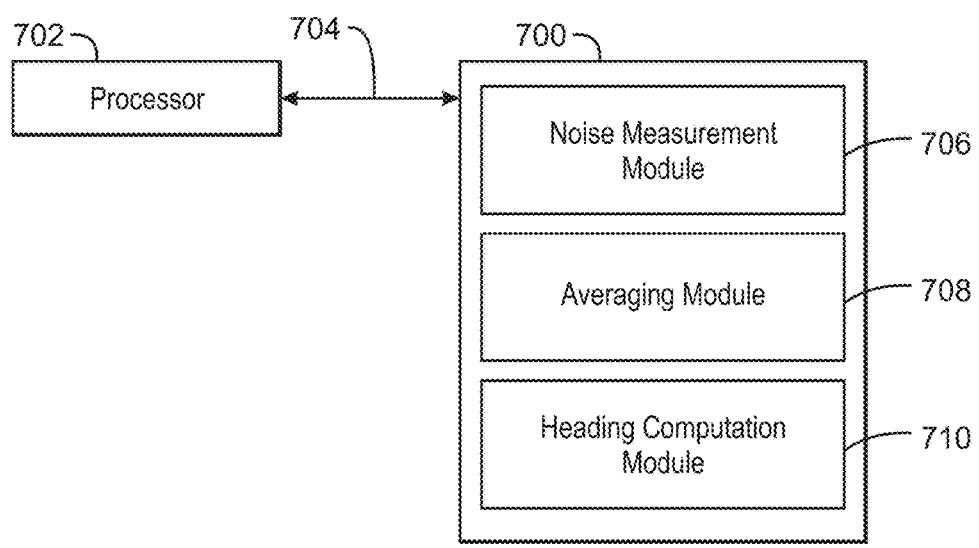
FIG. 7 is a block diagram showing a tangible, non-transitory machine readable medium that stores code for computing a magnetic heading.

FIG. 7 is a block diagram showing a tangible, non-transitory machine readable medium that stores code for computing a magnetic heading. The tangible, non-transitory machine readable medium 700 may be accessed by a processor 702 over a computer bus 704. Furthermore, the tangible, non-transitory machine readable medium 700 may include code configured to direct the processor 702 to perform the methods described herein.

The various software components discussed herein may be stored on the tangible, non-transitory machine readable medium 700, as indicated in FIG. 7. For example, a noise measurement module 706 can measure the level of time-varying noise present in the magnetic sensor output data. An averaging module 708 can be used to compute an applied sensor output by computing an average of the sensor output data using a determined sample size. The averaging module can also determine a suitable sample size based on the level of noise in the sensor output data, the desired accuracy, and the desired confidence level. A heading computation module 710 can be used to compute a magnetic heading based the sensor output. The heading computation module 710 can also determine whether to use the raw sensor output data to compute the magnetic heading or whether to apply averaging to the sensor output data.

It is to be understood that the block diagram of FIG. 7 is not intended to indicate that the tangible, non-transitory machine readable medium 700 is to include all of the components shown in FIG. 7. Further, any number of additional components not shown in FIG. 7 may be included within the tangible, non-transitory machine readable medium 700, depending on the details of the specific implementation.

Example 1

An example of a computing device that computes a magnetic heading is described herein. The computing device includes a magnetic sensor to collect sensor output data and a heading computation engine to compute a magnetic heading based on the sensor output data. The heading computation engine includes logic to measure a level of noise in the sensor output data. The heading computation engine also includes logic to determine whether to average the sensor output data based, at least in part, on the level of noise. The heading computation engine also includes logic to determine an applied sensor output based on the sensor output data. The heading computation engine also includes logic to compute a magnetic heading based, at least in part, on the applied sensor output.

The logic to determine whether to average the sensor output data may determine whether to average the sensor output data based, at least in part, a desired heading accuracy. In some embodiments, the logic to determine whether to average the sensor output data determines that the sensor output data is not to be averaged and the applied sensor output is a single sample of the sensor output data. In some embodiments, the logic to determine whether to average the sensor output data computes a threshold noise based on a desired heading accuracy and determines whether the level of noise is below the noise threshold. In some embodiments, the logic to determine whether to average the sensor output data computes a signal magnitude threshold based on the level of noise and a desired heading accuracy and determines whether a signal magnitude of the sensor output data is above the signal magnitude threshold.

The computing device may also include a motion sensor to determine whether the magnetic sensor is stationary, wherein the logic to measure a level of noise in the sensor output data measures the level of noise when the magnetic sensor is stationary. In some embodiments, the logic to determine whether to average the sensor output data determines that the sensor output data is to be averaged and the logic to determine the applied sensor output determines a sample size of the sensor output data based, at least in part, on the level of noise. In some embodiments, the logic to determine the applied sensor output determines the sample size based on the level of noise, a desired heading accuracy, and a confidence level. In some embodiments, the computing device also includes a user interface that enables a user to specify the desired heading accuracy. In some embodiments, the desired heading accuracy is specified by an application of the computing device.

Example 2

An example of a method for computing a magnetic heading is described herein. The method includes receiving sensor output data from a magnetic sensor and measuring a level of noise in the sensor output data. The method also includes determining whether to average the sensor output data based, at least in part, on the level of noise. The method also includes determining an applied sensor output based on the sensor output data. The method also includes computing a magnetic heading based, at least in part, on the applied sensor output. The method also includes sending the magnetic heading to a component of a computing device for use by an application.

Determining whether to average the sensor output data may include determining whether to average the sensor output data based, at least in part, on a desired heading accuracy. The method may also include setting the applied sensor output as a single sample of the sensor output data if it is determined that the sensor output data is not to be averaged. In some embodiments, determining whether to average the sensor output data includes computing a threshold noise based on a desired heading accuracy and determining whether the level of noise is below the noise threshold. In some embodiments, determining whether to average the sensor output data includes computing a signal magnitude threshold based on the level of noise and a desired heading accuracy and determining whether a signal magnitude of the sensor output data is above the signal magnitude threshold.

Measuring the level of noise in the sensor output data may include measuring the level of noise when the magnetic sensor is stationary. The method may also include, determining a sample size of the sensor output data based, at least in part, on the level of noise if it is determined that the sensor output data is to be averaged. The sample size may be determined based on the level of noise, a desired heading accuracy, and a confidence level. In some embodiments, the method includes receiving the desired heading accuracy specified by a user. In some embodiments, the method includes receiving the desired accuracy from an application of the computing device.

Example 3

An example of a non-transitory, tangible, machine-readable medium having instructions stored thereon for computing a magnetic heading is described herein. The instructions, when executed by a processor, direct the processor to receive sensor output data from a magnetic sensor and measure a level of noise in the sensor output data. The instructions also direct the processor to determine whether to average the sensor output data based, at least in part, on the level of noise. The instructions also direct the processor to determine an applied sensor output based on the sensor output data. The instructions also direct the processor to compute a magnetic heading based, at least in part, on the applied sensor output.

The instructions that direct the processor to determine whether to average the sensor output data may determine whether to average the sensor output data based, at least in part, on a desired heading accuracy. The instructions may direct the processor to use a single sample of the sensor output data as the applied sensor output if it is determined that the sensor output data is not to be averaged. In some embodiments, the instructions direct the processor to compute a threshold noise based on a desired heading accuracy and determine whether the level of noise is below the noise threshold to determine whether to average the sensor output data. In some embodiments, the instructions direct the processor to compute a signal magnitude threshold based on the level of noise and a desired heading accuracy and determine whether a signal magnitude of the sensor output data is above the signal magnitude threshold to determine whether to average the sensor output data.

The instructions may also direct the processor to determine whether the magnetic sensor is stationary and measure the level of noise of the sensor output data only if the magnetic sensor is stationary. The instructions may also direct the processor to determine a sample size of the sensor output data based, at least in part, on the level of noise if it is determined that the sensor output data is to be averaged. In some embodiments, the instructions direct the processor to determine the sample size based on the level of noise, a desired heading accuracy, and a confidence level. In some embodiments, the instructions direct the processor to receive the desired heading accuracy from a user. In some embodiments, the instructions direct the processor to receive the desired accuracy from an application executing on a computing device.

In the above description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, described herein. The various appearances "an embodiment," "one embodiment," or "some embodiments" are not necessarily all referring to the same embodiments.

Not all components, features, structures, or characteristics described and illustrated herein are to be included in a particular embodiment or embodiments in every case. If the specification states a component, feature, structure, or characteristic "may", "might", "can" or "could" be included, for example, that particular component, feature, structure, or characteristic may not be included in every case. If the specification or claims refer to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein may not be arranged in the particular way illustrated and described herein. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the machine readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A computing device, comprising:
   a processor;
   a magnetic sensor to collect sensor output data;
   a heading computation engine to compute a magnetic heading based on the sensor output data, the heading computation engine comprising:
      logic to measure a level of noise in the sensor output data;
      logic to compute a threshold noise level based on a specified heading accuracy and compare the level of noise to the threshold noise level to determine whether to average the sensor output data;
      logic to determine an applied sensor output based on the sensor output data; and
      logic to compute a magnetic heading based, at least in part, on the applied sensor output and provide the magnetic heading to an application to be executed by the processor.

2. The computing device of claim 1, wherein the logic to determine whether to average the sensor output data determines that the sensor output data is not to be averaged and the applied sensor output is a single sample of the sensor output data.

3. The computing device of claim 1, wherein the logic to determine whether to average the sensor output data computes a signal magnitude threshold based on the level of noise and a desired heading accuracy and determines whether a signal magnitude of the sensor output data is above the signal magnitude threshold.

4. The computing device of claim 1, comprising a motion sensor to determine whether the magnetic sensor is stationary, wherein the logic to measure a level of noise in the sensor output data measures the level of noise when the magnetic sensor is stationary.

5. The computing device of claim 1, wherein the logic to determine whether to average the sensor output data determines that the sensor output data is to be averaged and the logic to determine the applied sensor output determines a sample size of the sensor output data based, at least in part, on the level of noise.

6. The computing device of claim 5, wherein the logic to determine the applied sensor output determines the sample size based on the level of noise, the specified heading accuracy, and a confidence level.

7. The computing device of claim 1, comprising a user interface that enables a user to specify the specified heading accuracy.

8. The computing device of claim 1, wherein the specified heading accuracy is specified by an application of the computing device.

9. A method, comprising:
   computing a threshold noise level based on a specified heading accuracy;
   receiving sensor output data from a magnetic sensor;
   measuring a level of noise in the sensor output data;
   comparing the level of noise to the threshold noise level and determining whether to average the sensor output data based, at least in part, on the comparison;
   determining an applied sensor output based on the sensor output data;
   computing a magnetic heading based, at least in part, on the applied sensor output; and
   sending the magnetic heading to a component of a computing device for use by an application.

10. The method claim 9, comprising, if it is determined that the sensor output data is not to be averaged, setting the applied sensor output as a single sample of the sensor output data.

11. The method of claim 9, wherein determining whether to average the sensor output data comprises computing a signal magnitude threshold based on the level of noise and a desired heading accuracy and determining whether a signal magnitude of the sensor output data is above the signal magnitude threshold.

12. The method of claim 9, wherein measuring the level of noise in the sensor output data comprises measuring the level of noise when the magnetic sensor is stationary.

13. The method of claim 9, comprising, if it is determined that the sensor output data is to be averaged, determining a sample size of the sensor output data based, at least in part, on the level of noise.

14. The method of claim 13, wherein the sample size is determined based on the level of noise, the specified heading accuracy, and a confidence level.

15. The method of claim 9, comprising receiving the specified heading accuracy specified by a user.

16. The method of claim 9, comprising receiving the specified heading accuracy from an application of the computing device.

17. A non-transitory, tangible, machine-readable medium having instructions stored thereon that, when executed by a processor, direct the processor to:
   compute a threshold noise level based on a specified heading accuracy;
   receive sensor output data from a magnetic sensor;
   measure a level of noise in the sensor output data;
   compare the level of noise to the threshold noise level and determine whether to average the sensor output data based, at least in part, on the comparison;
   determine an applied sensor output based on the sensor output data; and
   compute a magnetic heading based, at least in part, on the applied sensor output.

18. The machine-readable medium of claim 17, comprising instructions that direct the processor to use a single sample of the sensor output data as the applied sensor output if it is determined that the sensor output data is not to be averaged.

19. The machine-readable medium of claim 17, comprising instructions that direct the processor to compute a signal magnitude threshold based on the level of noise and a desired heading accuracy and determine whether a signal magnitude of the sensor output data is above the signal magnitude threshold to determine whether to average the sensor output data.

20. The machine-readable medium of claim 17, comprising instructions that direct the processor to determine whether the magnetic sensor is stationary and measure the level of noise of the sensor output data only if the magnetic sensor is stationary.

21. The machine-readable medium of claim 17, comprising instructions that direct the processor to determine a sample size of the sensor output data based, at least in part, on the level of noise if it is determined that the sensor output data is to be averaged.

22. The machine-readable medium of claim 21, comprising instructions that direct the processor to determine the sample size based on the level of noise, the specified heading accuracy, and a confidence level.

23. The machine-readable medium of claim 17, comprising instructions that direct the processor to receive the specified heading accuracy from a user.

24. The machine-readable medium of claim 17, comprising instructions that direct the processor to receive the specified heading accuracy from an application executing on a computing device.

* * * * *